United States Patent [19]
Logston et al.

[11] Patent Number: 5,467,342
[45] Date of Patent: Nov. 14, 1995

[54] METHODS AND APPARATUS FOR TIME STAMP CORRECTION IN AN ASYNCHRONOUS TRANSFER MODE NETWORK

[75] Inventors: Gary L. Logston, Tucker; Anthony J. Wasilewski, Alpharetta; Maynard Hammond, Lawrenceville; Francis Cheung, Tucker, all of Ga.

[73] Assignee: Scientific-Atlanta, Inc., Atlanta, Ga.

[21] Appl. No.: 318,124

[22] Filed: Oct. 5, 1994

Related U.S. Application Data

[63] Continuation-in-part of Ser. No. 180,227, Jan. 12, 1994, abandoned, and a continuation-in-part of Ser. No. 219,652, Mar. 29, 1994.

[51] Int. Cl.$^6$ .............................. H04J 3/16; H04L 12/56; H04Q 11/04
[52] U.S. Cl. .............................. 370/17; 370/601; 370/82; 370/94.2
[58] Field of Search .............................. 370/13, 17, 58.1, 370/58.2, 58.3, 60, 60.1, 79, 82, 83, 94.1, 94.2, 99

[56] References Cited

U.S. PATENT DOCUMENTS

| | | | |
|---|---|---|---|
| 4,569,042 | 2/1986 | Larson | 370/13 |
| 4,748,620 | 5/1988 | Adelmann et al. | 370/94.1 |
| 4,894,823 | 1/1990 | Adelmann et al. | 370/60 |
| 5,050,166 | 9/1991 | Cantoni et al. | 370/94.1 |
| 5,115,431 | 5/1992 | Williams | 370/94 |
| 5,127,000 | 6/1992 | Henrion | 370/60 |
| 5,166,926 | 11/1992 | Cisneros et al. | 370/60 |
| 5,206,858 | 4/1993 | Nakano et al. | 370/94.1 |
| 5,214,642 | 5/1993 | Kunimoto et al. | 370/82 |
| 5,255,291 | 10/1993 | Holden | 375/111 |
| 5,280,476 | 1/1994 | Kojima et al. | 370/60.1 |
| 5,287,535 | 2/1994 | Sakagawa et al. | 370/60 |

OTHER PUBLICATIONS

"Understanding Asynchronous Transfer Mode", *3TECH*, pp. 1–10 (Summer 1992).
R. Handel and M. N. Huber, *Integrated Broadband Networks: An Introduction to ATM-Based Networks*, pp. 92–102 (1991).
*MPEG-2 Systems*, Annex B (informative), pp. 86–96, CD ISO/IEC 13818, (Dec. 3, 1993).

*Primary Examiner*—Alpus Hsu
*Attorney, Agent, or Firm*—Woodcock Washburn Kurtz Mackiewicz & Norris

[57] ABSTRACT

Packets of data, some of which may carry a timestamp value, are transmitted through an Asynchronous Transfer Mode (ATM) network. Prior to transmission, each packet of data is encapsulated in a respective convergence sublayer protocol data unit (CS-PDU) having a header portion and a payload portion. The header portion of each CS-PDU contains a time correction indicator (TCI), which indicates whether the CS-PDU carries a packet of data having a timestamp value that may require correction after the CS-PDU passes through the network, and a time reference correction (TRC) field. Each CS-PDU is then segmented into a plurality of successive segments; a first one of the segments of each CS-PDU contains the CS-PDU header. Each segment is then inserted into the payload section of a respective ATM cell for transmission through the network. At each node in the network, cells are examined to determine if they contain a CS-PDU header. If a cell contains a CS-PDU header, any variable delays imposed upon that cell as it passed through the node are measured and added to the TRC field in the CS-PDU header prior to sending the cell to the next node. At a destination node, the accumulated TRC value may be added to the time stamp value of the packet carried in the CS-PDU in order to compensate for the variable delays imposed upon that packet as the cells carrying the packet traversed the network.

13 Claims, 8 Drawing Sheets

METHODS AND APPARATUS FOR TIME STAMP CORRECTION IN AN ASYNCHRONOUS TRANSFER MODE NETWORK

CROSS REFERENCE TO RELATED APPLICATIONS

This is a continuation-in-part of Ser. No. 08/180,227, filed Jan. 12, 1994, now abandoned and of Ser. No. 08/219,652, filed Mar. 29, 1994.

BACKGROUND OF THE INVENTION

1. Field of the Invention

The present invention is directed to communications systems in general, and more particularly, to methods and apparatus for correcting time stamps embedded in data streams to be carried in an Asynchronous Transfer Mode (ATM) network. The present invention is particularly useful for adjusting Program Clock References (PCR's) in an MPEG-2 Transport Stream to account for jitter introduced when the Transport Stream is transmitted across an ATM network.

2. Description of the Prior Art

Recently, the International Organization for Standardization (ISO) adopted a standard protocol for combining one or more "elementary streams" of coded video, audio or other data into a single bit stream suitable for transmission. Referred to as the MPEG-2 (ISO 13818) standard, the standard is composed of four parts: Video, Audio, Systems and Compliance. The Systems part of the standard is described in detail in the MPEG-2 Systems Committee Draft (ISO/IEC JTC1/SC29/WG11/N0601, November, 1993) [hereinafter "MPEG-2 Systems Committee Draft"], which is hereby incorporated by reference. An overview of the MPEG-2 Systems standard is provided in Wasilewski, *The MPEG-2 Systems Specification: Blueprint for Network Interoperability* (Jan. 3, 1994), which is also hereby incorporated by reference. The MPEG-2 Systems standard provides a syntax and set of semantic rules for the construction of bitstreams containing a multiplexed combination of one or more "programs." A "program" is composed of one or more related elementary streams. An "elementary stream" is the coded representation of a single video, audio or other data stream that shares the common timebase of the program of which it is a member. For example, in the context of a subscription television system, a "program" may comprise a network television broadcast consisting of two elementary streams: a video stream and an audio stream.

As defined in the MPEG-2 Systems standard, an elementary stream, whether video, audio or some other type of data, contains a continuous stream of "access units". An access unit is the coded representation of a "presentation unit." For video elementary streams, the presentation unit is a picture, and a corresponding access unit for that picture includes all the coded (e.g., compressed) data for that picture. The presentation unit for audio elementary streams is defined as the set of digital audio samples in a single "audio frame" An access unit for a given audio frame will include all the coded (e.g., compressed) data for that audio frame.

According to the MPEG-2 Systems standard, each elementary stream, i.e., the sequence of access units for one video, audio or other data stream, is packetized to form a Packetized Elementary Stream (PES). Each PES packet in a given Packetized Elementary Stream consists of a PES packet header followed by a payload containing one or more access units of that elementary stream. The Packetized Elementary Stream structure provides a means for packaging subparts (i.e., one or more access units) of a longer elementary stream into consecutive packets along with associated indicators and overhead information used to synchronize the presentation of that elementary stream with other, related elementary streams (e.g., elementary streams of the same program). Each Packetized Elementary Stream is assigned a unique Packet ID (PID). For example, the Packetized Elementary Stream containing the coded video data for a network television program may be assigned a PID of "10"; the Packetized Elementary Stream containing the associated audio data for that program may be assigned a PID of "23", and so on.

Further in accordance with the MPEG-2 Systems standard, one or more Packetized Elementary Streams may be further segmented or "packetized" to facilitate combining those streams into a single bitstream for transmission over some medium. The MPEG-2 Systems Committee Draft specifies two different protocols for combining one or more Packetized Elementary Streams into a single bitstream: 1) the Program Stream (PS) protocol and 2) the Transport Stream protocol. Both stream protocols are packet-based and fall into the category of "transport layer" entities, as defined by the ISO Open System Interconnection (OSI) reference model. Program Streams utilize variable-length packets and are intended for "error-free" environments in which software parsing is desired. Program Stream packets are generally relatively large (1K to 2K bytes). Transport Streams utilize fixed length packets and are intended for transmission in noisy or errored environments. Each Transport Stream packet comprises a header portion and a payload portion. Transport Stream packets have a relatively short length of 188 bytes and include features for enhanced error resiliency and packet loss detection. As will become evident hereinafter, the methods and apparatus of the present invention are particularly well suited for use in the transmission of an MPEG-2 Transport Stream through an ATM network, and therefore, the remaining discussion will focus on MPEG-2 Transport Streams. It is understood, however, that the methods and apparatus of the present invention is by no means limited thereto.

The MPEG-2 Transport Stream specification provides a standard format (i.e., syntax and set of semantic rules) for combining one or more Packetized Elementary Streams into a single "Transport Stream" that may then be transmitted over some medium. FIG. 1 graphically illustrates the generation of an MPEG-2 Transport Stream from a plurality of Packetized Elementary Streams. Generation of an MPEG-2 Transport Stream begins by segmenting each Packetized Elementary Stream and inserting successive segments into the payload sections of successive Transport Stream Packets. For example, as illustrated in FIG. 1, one of the PES packets 10 of the Packetized Elementary Stream containing the coded video of elementary stream "Video 1", is segmented and inserted into the payload sections of two consecutive Transport Packets 12 and 14. Every Transport Packet has a header, e.g., header 16 of Transport Packet 12, and the header of each Transport Packet contains the PID associated with the Packetized Elementary Stream carried in that Transport Packet. In the example illustrated in FIG. 1, the Packetized Elementary Stream carrying the coded video of elementary stream "Video 1" has been assigned a PID of '10', and therefore, the header of each Transport Packet 12, 14 carrying the data of that Packetized Elementary Stream will contain a PID value of '10'. Similarly, the headers of each Transport Packet 18, 20 carrying the Packetized Elementary Stream data for elementary stream "Audio 1" will contain the PID assigned to that elementary stream, which in the example shown is '23'. As each Packetized Elementary Stream is segmented and inserted into respective Transport Packets, those packets are fed to a Transport Stream multiplexer 22 that multiplexes the packets to form a single bitstream, referred to as a "Transport Stream." Thus, a Transport Stream comprises a continuous sequence of Transport Packets, each of which may carry data from one of a plurality of Packetized Elementary Streams. At a decoder location, a given Packetized Elementary Stream can be recovered from the incoming Transport Stream by simply extracting every incoming packet whose header contains the PID assigned to that Packetized Elementary Stream.

Further according to the MPEG-2 Systems standard, generation of Transport Packets for each Packetized Elementary Stream is carried out by an encoder employing a common system clock. Decoders for receiving and presenting a selected program (i.e., a set of related elementary streams) must have a system clock whose frequency of operation and absolute instantaneous value match those of the encoder. However, in practice, a decoder's free-running system clock frequency will not match the encoder's system clock frequency exactly, and therefore, some method for synchronizing the decoder system clock with the encoder system clock is required. In the MPEG-2 Systems standard, synchronization of a decoder's system clock with the encoder's system clock is achieved through the use of timestamps, referred to in the MPEG-2 Systems Committee Draft as Program Clock References (PCRs). A PCR is an actual sample (i.e., timestamp) of the encoder's system clock. For each program carried in a given Transport Stream, PCR's must be generated at least once every 100 ms and inserted into the Transport Packets carrying one of the elementary streams that make-up that program. For programs comprised of a video elementary stream and an audio elementary stream, PCR's are typically generated and inserted into the Transport Packets that carry the Packetized Elementary Stream data for the video elementary stream. In the example of FIG. 1, one PCR 24 was generated during the creation of Transport Packet 12 and another PCR was generated during the creation of Transport Packet 14, each of which carry PES data for the video elementary stream "Video 1". Similarly, a PCR 28 was generated during the creation of Transport Packet 32 which carries PES data for the video elementary stream "Video 21". Each PCR is an actual sample of the encoder system clock at the time the PCR was generated and inserted into its respective Transport Packet.

As can be appreciated, as the Transport Packets for each elementary stream reach the Transport Stream multiplexer 22, certain packets will experience some delay since the multiplexer can only "send" one packet at a time. When a PCR bearing Transport Packet is delayed, the original PCR in that packet is no longer valid. Consequently, the transport stream multiplexer 22 must "adjust" the original PCR to account for any delay imposed on that packet by the multiplexer. Essentially, the multiplexer simply determines the amount of delay the packet experienced between input and output, and then adds that delay time to the original PCR value as the packet leaves the multiplexer in the outgoing Transport Stream. As a result of this adjustment, the PCR's of a given program, no matter where they may appear in an incoming Transport Stream, should reflect the absolute value of the encoder's system clock at the time the packets bearing those PCR's were inserted into the outgoing Transport Stream at the encoder.

At a reception site, a decoder can use the transmitted PCR's to "slave" its system clock to the encoder's system clock. Decoders allow recipients of a Transport Stream to select one of the "programs" carried in the Transport Stream for output or presentation at a reception site. For example, in a subscription television system, wherein each program may represent a different television broadcast, a subscriber may employ a decoder to select one of those programs for viewing on a television set. A television program will typically comprise a video elementary stream and an audio elementary stream.

FIG. 2 is a block diagram of an exemplary decoder 40 that includes a clock generation circuit 58 capable of slaving the decoder system clock to the encoder's system clock. As shown, an MPEG-2 Transport Stream is received by the decoder 40 and provided to a Transport Stream de-multiplexer/parsing unit 42. A user's program selection is provided to the demultiplexer 42 via line 44. As described in greater detail in the MPEG-2 Systems Working Draft, information carried in certain system related Transport Packets enables the demultiplexer 42 to determine the PIDs of each elementary stream (i.e., video and audio) of the selected program. Once these PIDs are known, the demultiplexer 42 simply extracts every Transport Packet from the incoming Transport Stream whose header contains one of those PIDs. For example, referring back to FIG. 1, a subscriber may select Program 1 which consists of elementary streams "Video 1" and "Audio 1." Transport Packets carrying the Packetized Elementary Stream data for "Video 1" each have a PID of '10', and the Transport Packets carrying the Packetized Elementary Stream data for "Audio 1" each have a PID of '23'. As successive packets of the Transport Stream are received, the demultiplexer 42 will extract every incoming Transport Packet having a PID of '10' or '23'. Extracted Transport Packets will then be parsed in order to reassemble the original Packetized Elementary Streams. Ultimately, the coded video and audio data of each Packetized Elementary Stream will be provided to respective buffers 48, 54, and then to respective decoders 50, 56 which decode the data to produce analog video and audio signals for output to a display device.

In addition, as each Transport Packet of the selected program is received, the demultiplexer 42 determines whether that Transport Packet contains a PCR. If so, the PCR is extracted from the incoming packet and provided to the clock generation circuit 58 via line 59. As explained above, it is highly unlikely that the frequency of a decoder's system clock will be exactly the same as that of the original encoder, or that the decoder's system clock will be perfectly stable (i.e, will not drift). Accordingly, the PCR values, which are sent periodically in the Transport Stream, are used to correct the decoder's system clock as needed. Correction of the system clock is performed by the clock generation circuit 58.

As illustrated in FIG. 2, the clock generation circuit 58 implements a straightforward phase-lock-loop (PLL) except that the reference and feedback terms are numbers (e.g., the values of counter 66 and received PCRs). Upon initial acquisition of a user selected program, the counter 66 is loaded via line 61 with the first PCR received for that program. Thereafter, the PLL essentially operates as a closed loop. A voltage controlled oscillator (VCO) 64 having a nominal frequency substantially equal to that of the encoder system clock provides the decoder system clock signal. As the decoder system clock runs, the clock signal increments counter 66 which therefore represents the absolute time of the decoder system clock. As shown, the value of counter 66 is continuously fed back to a subtractor unit 60. Subtractor 60 compares the counter value with subsequent PCRs as they arrive in the Transport Stream Packets. Since a PCR, when it arrives, represents the correct timebase for the selected program, the difference between it and the value of counter 66 may be used to drive the instantaneous frequency of the VCO 64 to either slow down or speed up the decoder clock signal, as appropriate. A low-pass filter and gain stage (LPF) 62 is applied to the difference values from the subtractor 60 to produce a smooth control signal for the VCO 64. As can be appreciated, the continuous feedback provided by counter 66 and the periodic arrival of PCR values in the Transport Stream, ensure that the decoder system clock remains slaved to the encoder system clock. (Note: although the transmitted PCR's establish a timebase for a given program, synchronization of the audio and video elementary streams to the timebase of the program is accomplished using "presentation time stamps" which are carried in the PES packet headers of the respective Packetized Elementary Stream.)

Use of PCR's in the manner described above will accurately synchronize a decoder's system clock to an encoder's system clock so long as any delay in transmission of the MPEG-2 Transport Stream from the encoder to the decoder is constant for every Transport Packet in that stream. Unfortunately, in some transmission mediums, variable packet delays may be imposed on individual packets of the Transport Stream. For example, it is generally recognized that in the future, there will be a need to transmit MPEG-2 Transport Streams through Asynchronous Transfer Mode (ATM) networks. One problem likely to be encountered during transmission of an MPEG-2 Transport Stream through an ATM network is that certain Transport Packets are likely to experience variable delays (i.e., "jitter") as they pass through the network. For example, variable delays are likely to result from queuing delays at ATM switching nodes in the network. Such delays will undoubtedly change the order and relative temporal location of Transport Packets travelling through an ATM network, and therefore, will also change the relative order and temporal location of PCR's carried in those packets. Any PCR's of a given program that are delayed more or less than average will no longer be valid, since their values will no longer accurately reflect the value of the encoder system clock when they ultimately reach a decoder. For example, if one PCR experiences a delay greater than the average delay experienced by other PCR's, that PCR will arrive later than its value would indicate. If the delay is large enough, the clock generation circuit and/or buffers in the decoder may not be able to recover from the discrepancy between the expected and received PCR values.

Accordingly, there is a need for methods and apparatus for adjusting the timestamps in a datastream, such as the PCR's in an MPEG-2 Transport Stream, to account for delays experienced while the datastream propagates through the switching nodes of an ATM network. The present invention satisfies this need.

SUMMARY OF THE INVENTION

Briefly stated, the present invention is directed to methods and apparatus for transmitting packets of data, some of which may carry a timestamp value, through an Asynchronous Transfer Mode (ATM) network and for adjusting the timestamp values carried in those packets to compensate for variable delays experienced at switching nodes in the network. According to the methods of the present invention, packets of data to be transmitted through an ATM network are each encapsulated in a respective convergence sublayer protocol data unit (CS-PDU) having a header portion and a payload portion. The header portion of each CS-PDU contains a time reference correction (TRC) field. Each CS-PDU is then segmented into a plurality of successive segments; a first one of the segments of each CS-PDU contains the CS-PDU header. Each segment is then inserted into the payload section of a respective ATM cell for transmission through the network. At each node in the network, cells are examined to determine if they contain a CS-PDU header. If a cell contains a CS-PDU header, any variable delays imposed upon that cell as it passed through the node are measured and added to the TRC field in the CS-PDU header prior to sending the cell to the next node. At a destination node, the accumulated TRC value may be added to the PCR of the packet carried in the CS-PDU in order to compensate for the variable delays imposed upon that packet as the cells carrying the packet traversed the network.

In more detail, the packets of data are preferably carried in the payload portion of respective CS-PDUs, and the header portion of each CS-PDU comprises a time correction indicator (TCI) and in addition to the time reference correction (TRC) field. Preferably, the TRC field comprises 18-bits and is initialized to a value of zero. The TCI of each CS-PDU indicates whether the packet of data in the payload portion of that CS-PDU contains a timestamp value that may require adjustment at a destination or exit node of the network. Each CS-PDU header may also contain error correction and/or parity fields.

As mentioned, each CS-PDU is then segmented into a plurality of successive segments, and a first one of the segments of each CS-PDU will contain the header portion of that CS-PDU. Each segment of a given CS-PDU is then inserted into the payload portion of a respective ATM cell for transmission through the network. Preferably, a CS-PDU Header Indicator (CHI) field is defined in the header of each ATM cell to provide an indication of whether a the cell contains the header portion of a CS-PDU. In one embodiment, the 3-bit Payload Type field already defined in the ATM reference model is used as the CHI. A PT field value of '111', which is presently undefined, may be used to indicate that a cell contains the header portion of a CS-PDU. Any other technique for indicating whether a given cell contains a CS-PDU header may be employed without deviating from the spirit and scope of the present invention. For example, out-of-band signalling may be employed, alone or in combination with a CHI field in the cell header.

According to a method of the present invention, when a cell is received at a switching node in the network, the node determines whether that cell contains the header portion of one of the CS-PDUs. According to the preferred embodiment, the CHI field (which in one embodiment comprises the cell header's PT field) indicates whether the cell contains a CS-PDU header. If the cell does contains the header portion of one of the CS-PDUs, then the TCI in that CS-PDU header is examined to determine whether the packet of data encapsulated in that CS-PDU carries a timestamp value that may require adjustment. If the TCI indicates that the packet of data carried in the CS-PDU does carry a timestamp value to be adjusted, then any delay imposed upon the cell at the current switching node is calculated and added to the value in the TRC field of the CS-PDU header. The cell may then be output from the node and sent to the next node in the network. The foregoing steps are performed at each switching node in the network. Consequently, the value of TRC field of the CS-PDU header represents an accumulation of the variable delay experienced by the cell carrying that header as the cell traverses the network.

At a destination node, each incoming cell is again examined to determine whether it carries the header portion of a CS-PDU, and if so, the destination node waits for the other cells containing the remainder of the CS-PDU to arrive at the destination node. The original CS-PDU is then reassembled from the respective segments carried in each cell. Once the CS-PDU is reassembled, the CS-PDU header is extracted and the TCI is examined to determine whether the payload of the CS-PDU contains a packet of data having a timestamp value that requires correction. If correction is indicated by the TCI, the destination node adds the value in the TRC field of the CS-PDU header, along with any additional delay imposed at the destination node, to the timestamp value in the packet of data. The adjusted timestamp value will therefore reflect any variable delays imposed on the packet of data as it passed through the ATM network.

Although the method of the present invention is by no means limited to any one form of timestamp or datastream, the present invention is particularly well suited for the correction of a Program Clock Reference (PCR) embedded in an MPEG-2 Transport Stream Packet to be transmitted through an ATM network.

The present invention is also directed to apparatus for maintaining, in a field of an ATM cell, a value indicative of the accumulated variable delay imposed upon the ATM cell as the ATM cell passes through a switching node of an ATM network, wherein the switching node has a local system clock signal. In accordance with the present invention, the apparatus comprises: a counter responsive to the local system clock signal for maintaining a value indicative of the absolute value of the local system clock signal; a first module coupled to an input of the switching node and to the counter for receiving the ATM cell and for subtracting the value of the counter from the value in the field of the ATM cell as the ATM cell enters the switching node; and a second module coupled to an output of the switching node and to the counter for adding the value of the counter to the value in the field of the ATM cell as the ATM cell exits the switching node. By subtracting the counter value from the field of the ATM cell as the cell enters the switching node, and then adding the updated counter value to the field as the cell exits the switching node, the value in that field of the ATM cell will include any variable delay imposed on the ATM cell as it passed through the switching node.

Additional features and details of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
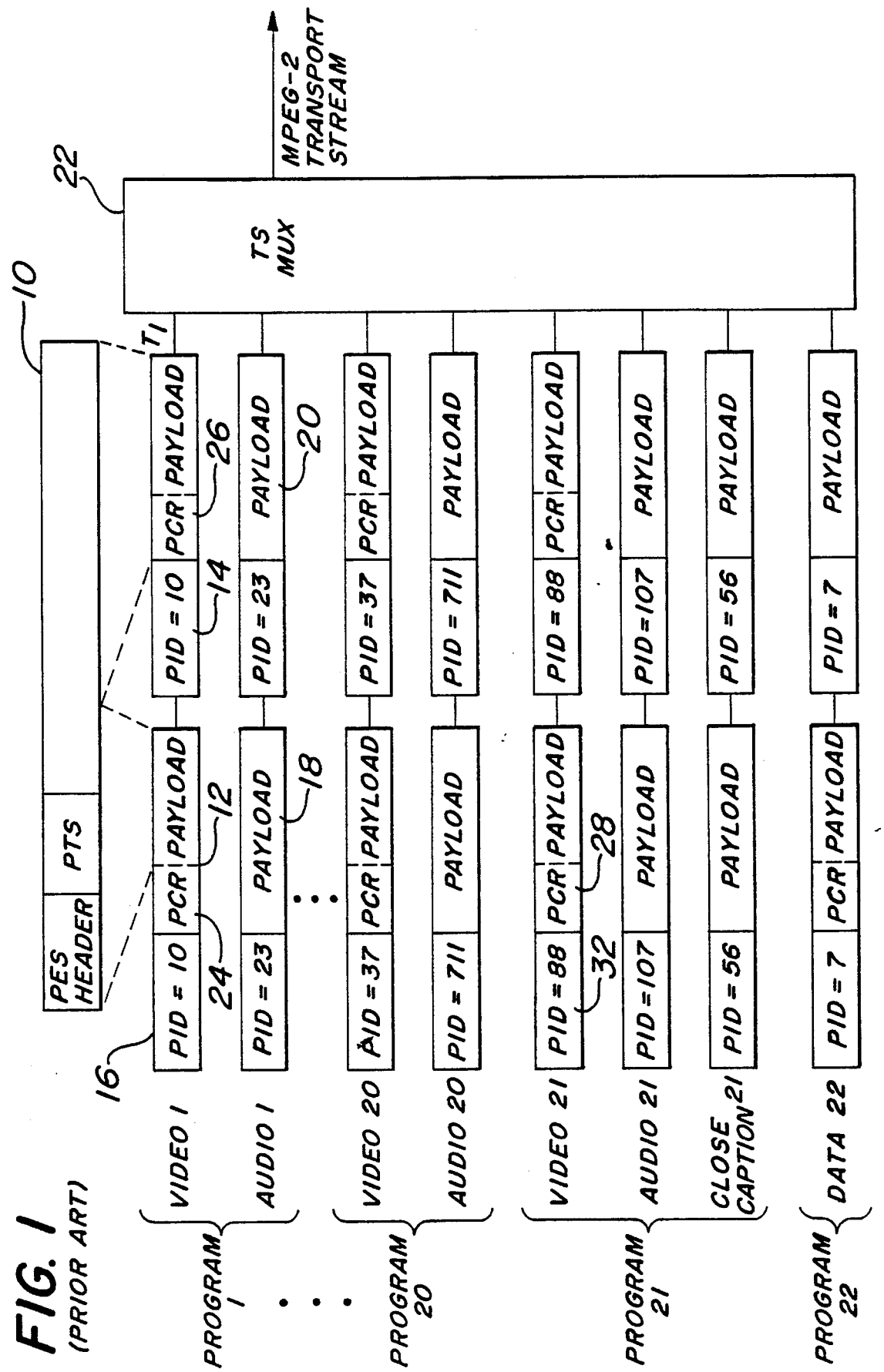
FIG. 1 graphically illustrates the generation of an MPEG-2 Transport Stream from a plurality of Packetized Elementary Streams in an MPEG-2 compliant encoder.
Figure 2:
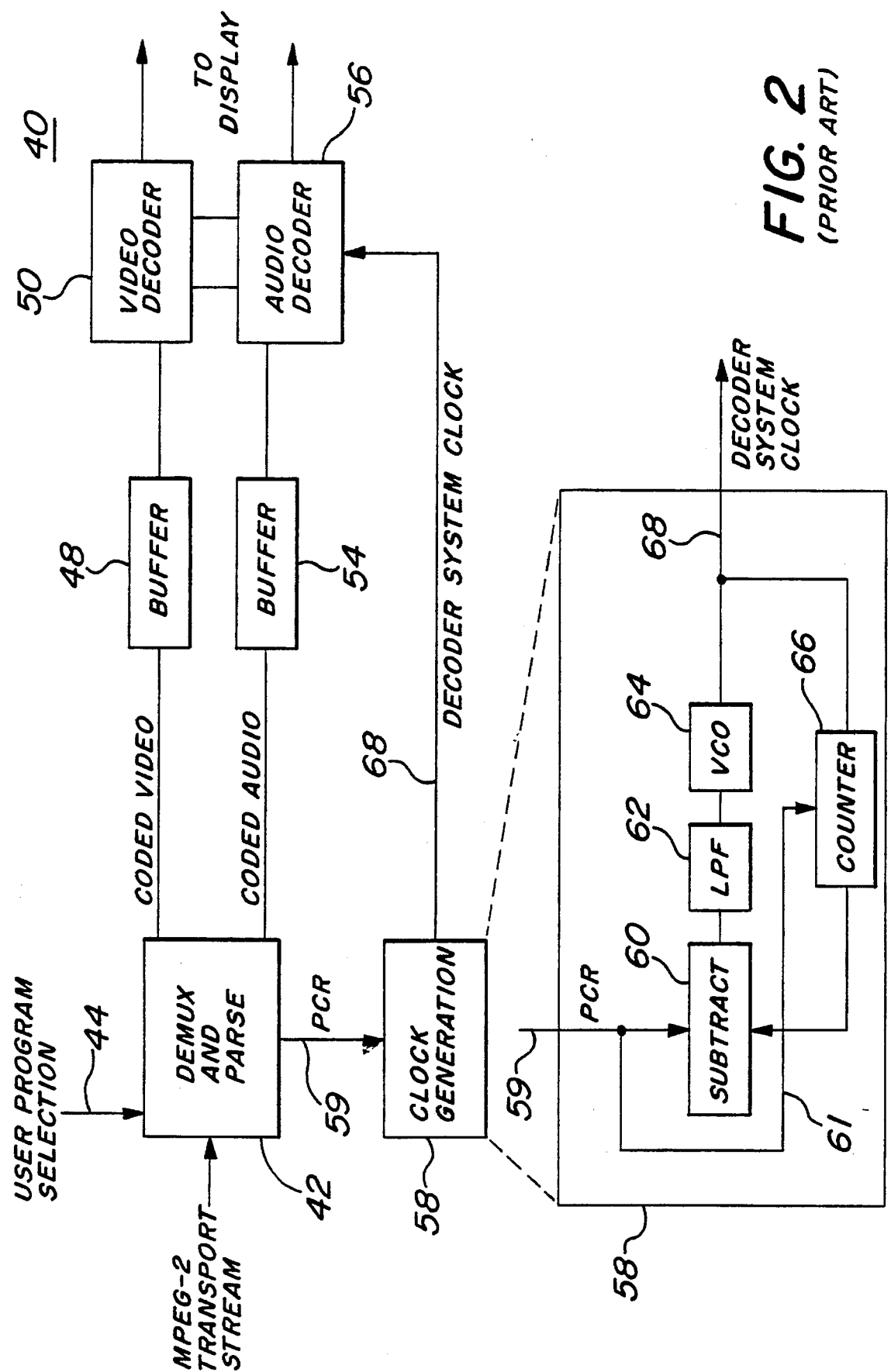
FIG. 2 is a block diagram of an exemplary decoder for recovering a selected program from an incoming MPEG-2 Transport Stream.
Figure 3:
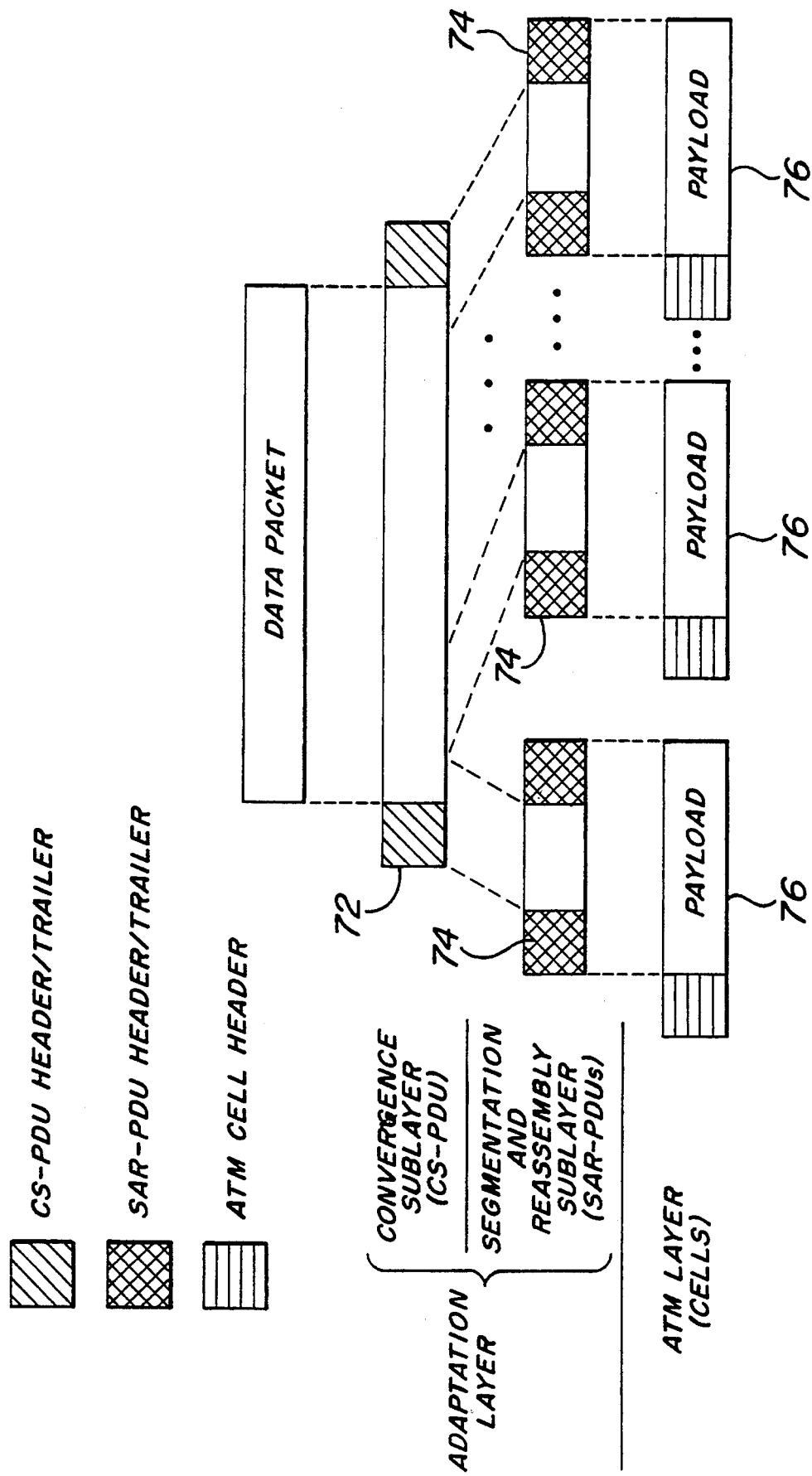
FIG. 3 illustrates the encapsulation of data within the various sublayers of the Asynchronous Transfer Mode (ATM) reference model.

Referring to the drawings, wherein like numerals indicate like elements throughout, FIG. 3 illustrates the encapsulation of data within the various layers and sublayers of the Asynchronous Transfer Mode (ATM) reference model. As illustrated, the ATM reference model, upon which all ATM networks are based, comprises an ATM layer and an Adaptation layer, which includes both a Convergence Sublayer (CS) and a Segmentation and Reassembly Sublayer (SAR). A packet of raw data 70 to be transmitted through an ATM-based network may first be encapsulated at the convergence sublayer. The fundamental data unit at the convergence sublayer is a Convergence Sublayer Protocol Data Unit (CS-PDU) 72. CS-PDUs may add overhead information to the raw data, in the form of headers and/or trailers, for such purposes as padding and error correction. Each CS-PDU may then be segmented and further encapsulated at the Segmentation and Reassembly sublayer. The fundamental data unit at the SAR sublayer is a Segmentation and Reassembly Protocol Data Unit (SAR-PDU) 74. As shown, a CS-PDU 72 may be segmented and inserted into the payload sections of consecutive SAR-PDUs 78. Each SAR-PDU 78 may add additional header and trailer overhead. At the ATM level, each SAR-PDU is inserted into the 48 octet payload of an ATM cell 76. ATM cells 76 are the fundamental transmission entities in an ATM network. An ATM cell contains the 48 octet payload section mentioned above and a 5 octet header containing network related information, such as cell routing information (e.g. virtual channel and path identifiers). ATM cell headers also contain a three-bit Payload Type (PT) field. Currently, a PT field value of '111' is undefined.

Generally, the ATM layer is unaware of the type of data it is carrying. The Adaptation Layer is responsible for providing necessary overhead information for different types of data transmitted through the network. Such additional functionality is implemented at the Adaptation Layer through pre-defined CS-PDU and SAR-PDU structures. At present, the international community has defined five Adaptation Layer protocols, referred to respectively as AAL1 through AAL5, to handle specific types of data. Currently, there is no such Adaptation Layer protocol for handling the transmission of MPEG-2 Transport Streams through an ATM-based network. For purposes of the present invention, however, Applicants have defined a new Adaptation Layer protocol, including CS-PDU and SAR-PDU structures, to facilitate the transmission of MPEG-2 Transport Packets through an ATM-based network, and more particularly, to provide a means for the correction of Program Clock References (PCRs) in such packets to account for jitter introduced by the ATM network.

Figure 4:
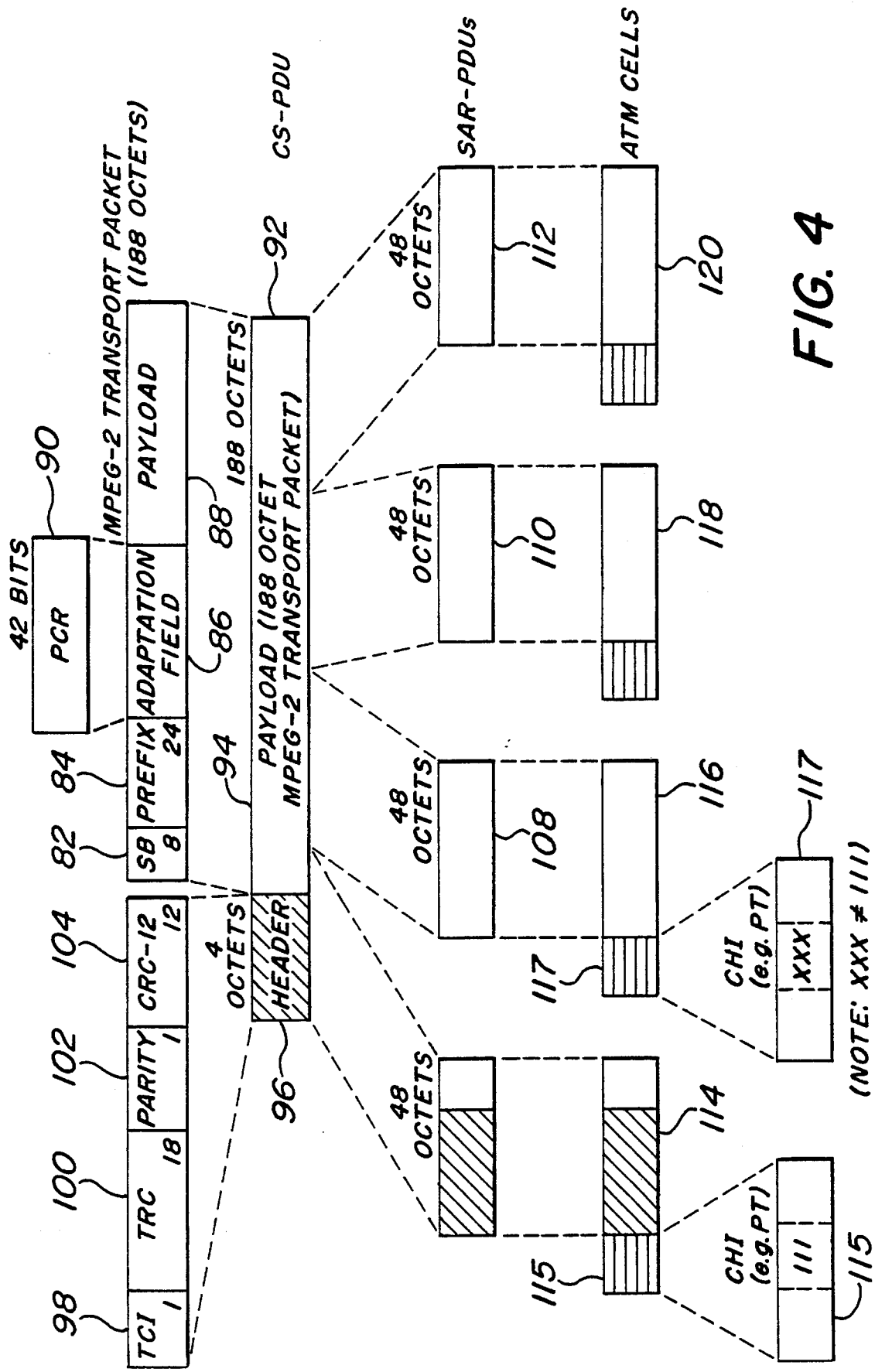
FIG. 4 illustrates the general format and arrangement of an ATM Adaptation Layer protocol defined in accordance with the present invention to facilitate the transmission of an MPEG-2 Transport Stream through an ATM-based network.

FIG. 4 illustrates the general format and arrangement of an Adaptation Layer protocol, including CS-PDU and SAR-PDU structures, defined in accordance with the present invention in order to facilitate the transmission of MPEG-2 transport Packets through an ATM-based network and to provide a means for adjusting timestamps (i.e., PCRs) carried in those packets. As shown, a typical MPEG-2 Transport Packet 80 comprises a Sync Byte (SB) 82, a Prefix 84 containing a Packet ID (PID) and other transport-related information, and a payload section 88 that may contain the data of a particular Packetized Elementary Stream. Additionally, the Transport Packet 80 may contain an optional "adaptation" field 86. Adaptation fields are convenience "windows" that can be opened in any Transport Packet in order to carry additional MPEG-related or private information of relevance to a given Transport Stream. As illustrated in FIG. 4, and of particular relevance to the present invention, adaptation fields are also used to carry PCRs. A PCR consists of 42 bits, the lower 9 bits of which implement a modulo 300 counter that increments at a rate of 27 MHz. At each modulo 300 "rollover", the count in the upper 33 bits is incremented. The upper 33 bits therefore represent a 90 KHz clock rate. As explained above, the value of a PCR represents a "snapshot" of the encoder system clock at the time those PCR bits were inserted into the Transport Stream.

According to the present invention, an adaptation layer CS-PDU 92 is defined that comprises a 188-octet payload section 94 and a 4-octet header 96. As illustrated, the payload section 94 of the CS-PDU 92 is sized to accommodate an entire MPEG-2 Transport Packet, e.g. packet 80. The header 96 comprises a Time Correction Indicator (TCI) 98, a Time Reference Correction (TRC) field 100, a Parity bit 102 and a CRC-12 calculated over the CS-PDU payload 94. As described hereinafter in greater detail, the single-bit TCI 98 indicates whether the timestamp adjustment method of the present invention is to be performed for this CS-PDU, and therefore, provides a mechanism for turning the timestamp correction feature of the present invention on or off. When timestamp adjustment is to be performed, the TRC field 100 is used to keep track of accumulated variable delay as the CS-PDU travels through the ATM network. The TRC field 100 comprises 18 bits and provides over 9 msec of jitter tracking. The Parity bit 102 provides even parity over the TRC and TCI.

As in any adaptation layer protocol, the CS-PDU 92 may be segmented and inserted into a number of consecutive SAR-PDUs. According to the present invention, SAR-PDUs have a payload size of 48 octets and do not include headers or trailers. Accordingly, no additional overhead information is added at the Segmentation and Reassembly sublayer. With a SAR-PDU size of 48 octets, the CS-PDU 92 may be equally segmented and inserted into four consecutive SAR-PDUs 106, 108, 110 and 112, as shown. With a CS-PDU header size of four octets, the first SAR-PDU 106 is guaranteed to contain the CS-PDU header. Each of the four SAR-PDU's 106..112 may subsequently be inserted into the payload section of a respective ATM cell 114, 116, 118, 120 for transmission through the ATM network.

According to another aspect of the present invention, a CS-PDU Header Indicator (CHI) field 107 is defined in the header of each ATM cell. The CHI field 107 in the header of each ATM cell is used to indicate whether that cell contains the header of an MPEG-2 Transport Packet bearing CS-PDU. Because most ATM cell header bits are already defined under the present ATM reference model, in accordance with one embodiment of the present invention, the 3-bit PT field of each ATM cell header is used as the CHI. A PT field value of '111', which has heretofore been undefined, may be used to indicate that a cell contains the header of an MPEG-2 Transport Packet bearing CS-PDU. Any other value would indicate that a cell carries either a portion of the CS-PDU payload or some other type of data altogether. Such an embodiment is illustrated in FIG. 4. As shown, the header 115 of cell 114, which contains the header 96 of CS-PDU 92, has a CHI (i.e., PT) field value of '111', while the header 117 of cell 116, and the headers (not shown) of cells 118 and 120, all have a CHI value of 'xxx', where 'xxx'≠'111'. It is understood, however, that in other embodiments, other combinations of bits in the ATM cell may be used to implement the CHI. Out-of-band signalling could also be employed to implement the CHI.

For example, in one alternate embodiment, out-of-band signalling may be used to indicate that a given cell contains the data of an MPEG-2 Transport Packet bearing CS-PDU. With such out-of-band signalling, a single bit in the ATM cell header, such as, for example, the User Data bit (i.e., the least significant bit) of the PT field in the cell header, can be used as the CHI. When the out-of-band signalling informs a node that a given cell contains the data of an MPEG-2 Transport Packet bearing CS-PDU, a value of '1' in the User Data bit of the cell's PT field could be used to indicate that the cell contains the CS-PDU header. A value of '0' would indicate that the cell merely contains a portion of the CS-PDU payload.

As the foregoing illustrates, therefore, according to the present invention, and in accordance with the Adaptation Layer protocol defined and illustrated in FIG. 4, an MPEG-2 Transport Packet 80 to be transmitted through an ATM network, which may contain a PCR 90 in the adaptation field 86 thereof, is encapsulated in a CS-PDU 92 as defined in FIG. 4. Four equal segments of the CS-PDU 92 define consecutive SAR-PDUs 106, 108, 110 and 112, the first SAR-PDU 106 containing the CS-PDU header 96. Each SAR-PDU 106..112 is then inserted into the payload section of a respective ATM cell 114..120. The CHI (e.g., the PT field) in the header 115 of the first ATM cell 114 is set to a value (e.g., PT ='111') indicating that its payload section contains the CS-PDU header. The CHI's in the headers of the other three ATM cells 116, 118, 120 are set to some other value.

At an insertion point into the network, each of the cells 114..120 will be assigned the same Virtual Path/Virtual Channel identifier to ensure proper routing of the cells through the network. Although the Virtual Path (VP) and/or Virtual Channel (VC) identifier of the cells may change at a given switching node in the network, each of the four cells will always have the same VC/VP identifier values. An important constraint imposed on ATM-based networks, and the ATM layer in particular, is that cells having a same VC or VP identifier may not be misordered as they propagate through the network. A related group of cells will therefore arrive at each switching node or destination node in the order in which they were launched into the network. Accordingly, of the four cells 114..120 of FIG. 4, the cell containing the CS-PDU header, i.e., cell 114, is guaranteed to be the first cell to arrive at any given switching node or destination node (assuming no cell loss).

With the adaptation layer protocol of FIG. 4, an entire MPEG-2 Transport Stream may be transmitted through an ATM network. Each successive MPEG-2 Transport Packet will be encapsulated in a respective CS-PDU and then segmented and inserted into four consecutive ATM cells. Some of the Transport Packets will, of course, contain a Program Clock Reference (PCR). As the ATM cells carrying successive Transport Packets of the Transport Stream propagate through the ATM network, a number of cells, and consequently, the Transport Packet data they carry, may experience variable delays at certain switching nodes in the network. Variable delays may result, for example, from queuing delays at each switching node. Any delay imposed upon the cells that carry PCR bearing Transport Packets will, of course, effect the validity of the PCRs carried in those packets. As explained above, such delays are commonly referred to as "jitter." If the jitter is substantial, a decoder that ultimately receives the PCR bearing Transport Packets may not be able to properly decode the elementary stream data carried in the Transport Packets. The present invention is directed to methods for use at each switching node and destination node in an ATM network for maintaining an accumulation of the delay experienced by PCR bearing CS-PDUs as they propagate through the ATM network, and for eventually adjusting the PCRs, if necessary, at a destination node.

Figure 5:
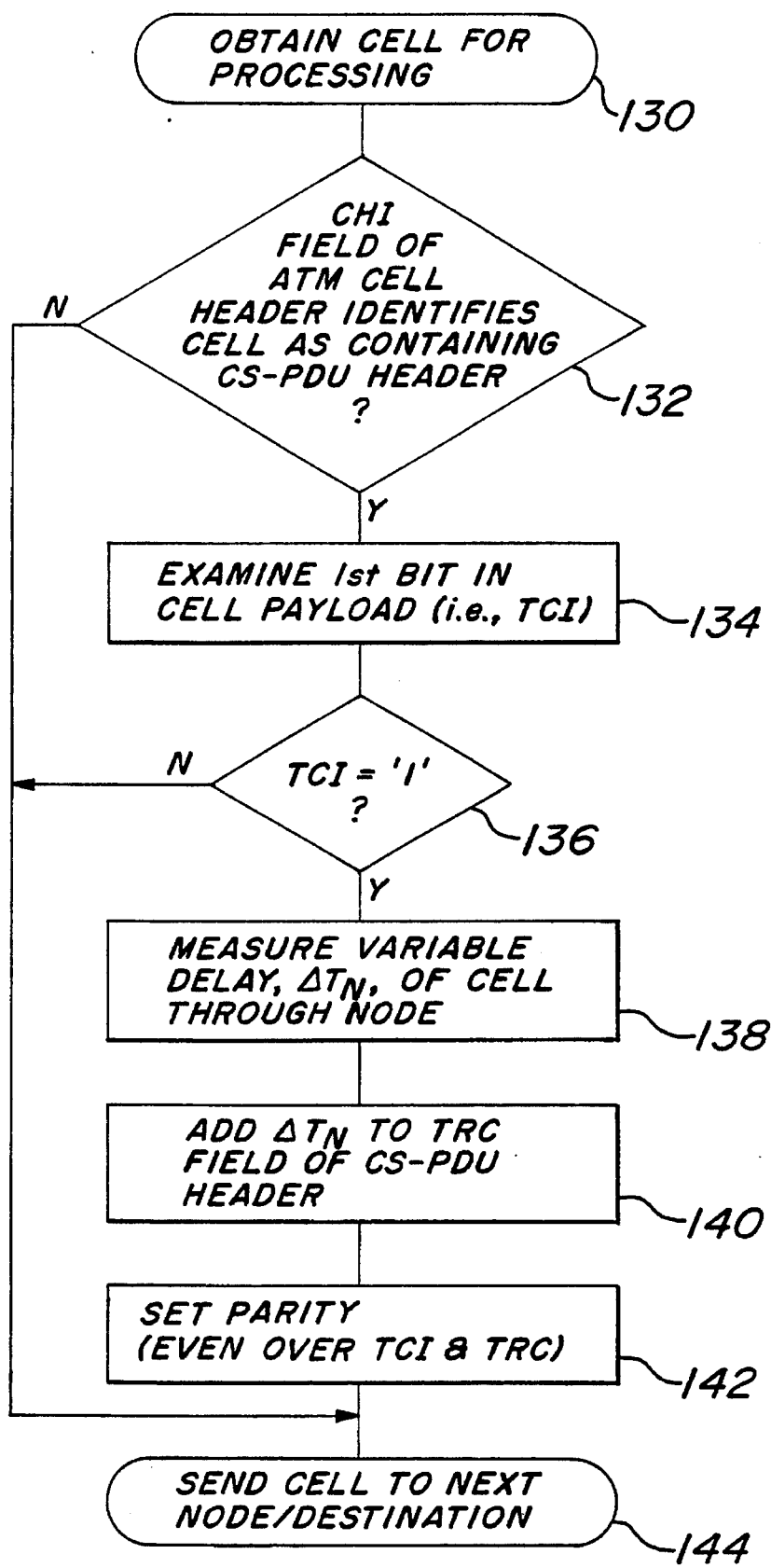
FIG. 5 is a flow diagram illustrating the steps to be performed at an ATM switching node in accordance with a preferred embodiment of the method of the present invention.

FIG. 5 is a flow diagram illustrating a method for tracking jitter at an ATM switching node in accordance with a preferred embodiment of the present invention. According to the present invention, method steps 130–144 are performed on each successive ATM cell after it has passed through the switching node and is ready to be sent to the next switching node or a destination node. At this point, therefore, the cell has already experienced any delays (e.g., queuing, etc.) imposed by the switching node. Before sending a given cell on to the next switching node or destination node, control passes to step 130 where the cell is obtained for processing in accordance with steps 132–142. Processing begins at step 132 where the CHI field (e.g., the PT field) of the cell header is examined to determine whether the cell's payload contains a CS-PDU header. If the cell does not contain a CS-PDU header (e.g., PT ≠'111'), no further processing is required and the cell may be sent to its next destination at step 144.

If, however, it is determined at step 132 that the cell does contain a CS-PDU header (e.g., PT ='111'), then control passes to step 134. At step 134, the switching node examines the first bit of the cell payload which, in accordance with the adaptation layer protocol defined in FIG. 4, is the TCI bit of the CS-PDU header. As mentioned above, the TCI (Time Correction Indicator) bit indicates whether the jitter tracking method of the present invention is to be performed for this CS-PDU. Jitter tracking need only be performed on those CS-PDU's that carry PCR bearing MPEG-2 Transport Packets. According to the present invention, therefore, when a given MPEG-2 Transport Packet is encapsulated in a CS-PDU, the TCI bit in the CS-PDU is set to a value of '1' if the adaptation field of that Transport Packet carries a PCR. The TCI bit is set to '0' for those Transport Packets that do not carry PCR values. As can be appreciated, even for those Transport Packets that do carry a PCR value, the TCI provides a means for disabling the jitter tracking feature of the present invention.

If at step 136, the TCI indicates that jitter tracking should not or need not be performed (i.e., TCI ='0'), no further processing is necessary and the cell may be sent to its next destination at step 144. If, however, the TCI indicates that jitter tracking is to be performed for the CS-PDU under consideration, then control passes to step 138. At step 138, the switching node determines the amount of variable delay, $\Delta T_N$, imposed on the cell as it passed from the input of the node to its output. The variable delay, $\Delta T_N$, may be calculated as follows:

$$\Delta T_N = LSCR(t_{out}) - LSCR(t_{in}) - D$$

where,

LSCR($t_{out}$) is the value of the switching node's local system clock when the cell under consideration reached the output of the node;

LSCR($t_{in}$) is the value of the switching node's local system clock when the cell under consideration entered the node; and D is the constant delay that is imposed on all ATM cells as they pass through the node.

Once calculated, any measured delay value, $\Delta T_N$, is added to the 18-bit TRC field of the CS-PDU header. Control then passes to step 140 where the Parity bit of the header is set to establish even parity over the TCI and TRC fields. Processing is then complete and the cell may be sent to its next destination (step 144). At the next switching node or destination node, steps 130–144 will again be performed and any measured delay imposed by that node will be added to the TRC value in the CS-PDU header. At a destination node, therefore, the TRC value will represent the total variable delay imposed upon the cell carrying the CS-PDU header.

Figure 6:
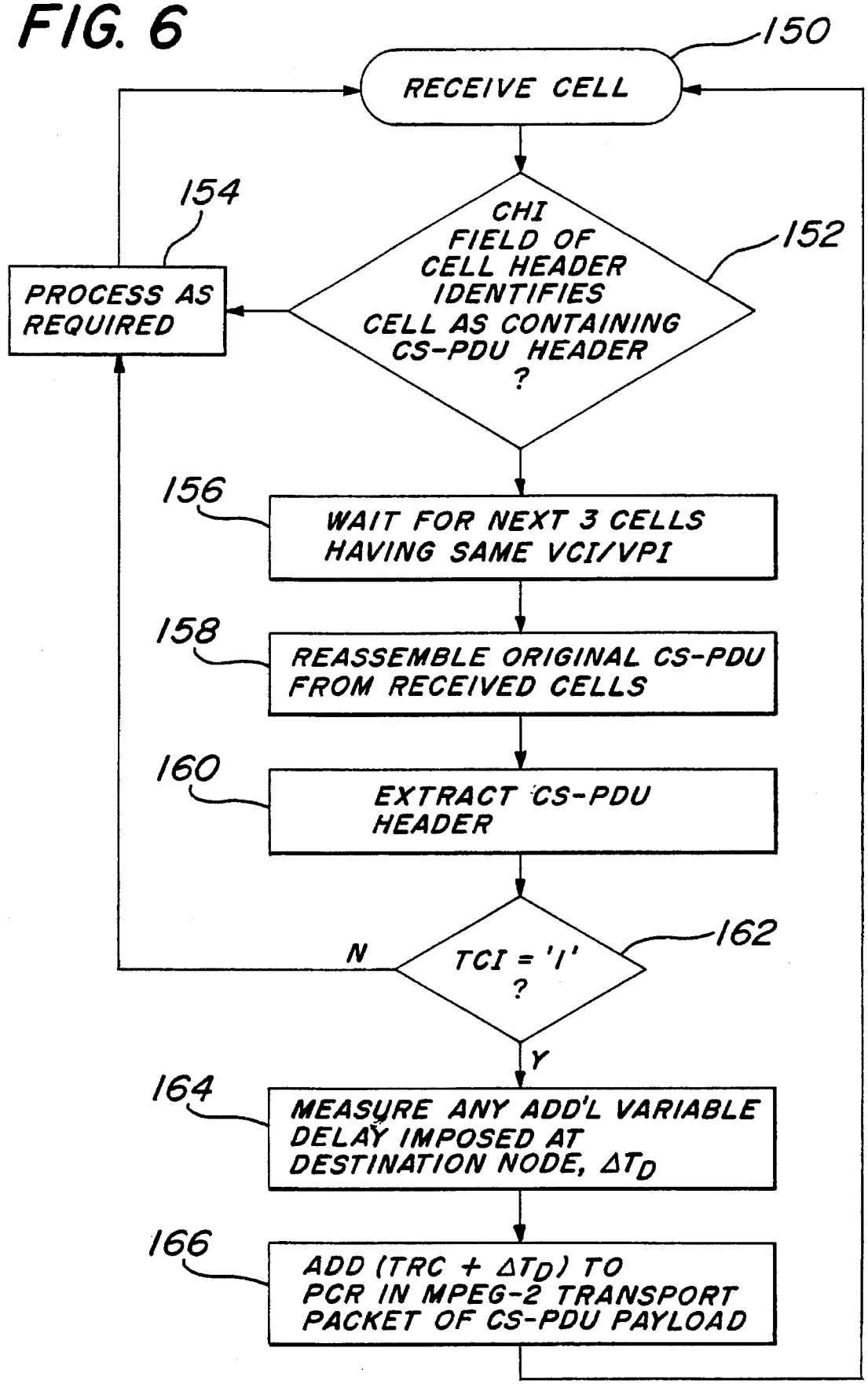
FIG. 6 is a flow diagram illustrating the steps to be performed at an output, or destination node, of an ATM network in accordance with the preferred embodiment of the method of the present invention.

FIG. 6 is a flow diagram illustrating a method to be carried out at a destination node (i.e., an exit point of the ATM network at which reassembly of the Transport Stream is performed) in order to correct, if necessary, the PCR of a Transport Packet carried in a given CS-PDU. At step 150, an ATM cell is received at the destination node. At step 152, the CHI field (e.g., the PT field in one embodiment) of the cell header is examined to determine whether the received cell contains the header of an MPEG-2 Transport Packet bearing CS-PDU. If the cell payload does not contain a CS-PDU header (e.g., PT ≠'111'), then control passes to step 154 where further processing of the cell may be performed as required. The next cell may then be received for processing at step 150.

If at step 152 it is determined that the cell does contain a CS-PDU header (e.g., PT ='111'), then control passes to step 156 where the destination node waits for the next three cells having the same virtual channel/virtual path identifiers. Recall from above that the four ATM cells carrying a given CS-PDU are all given the same virtual channel/virtual path identifier, and that an ATM network may never misorder those cells as they propagate through the network. Consequently, assuming no cell loss, the next three cells having the same virtual channel/virtual path identifier are guaranteed to contain the remainder of the CS-PDU. At step 158, the destination node extracts the payload from each of the four cells and reassembles the original CS-PDU.

Next, at step 160, the destination node extracts the header from the reassembled CS-PDU. Control then passes to step 162 where the TCI bit of the header is examined to determine whether timestamp adjustment in accordance with the present invention is to be performed on the Transport Packet carried in the payload section of the reassembled CS-PDU. If timestamp adjustment has been disabled (i.e., TCI ='0'), steps 164 and 166 are by-passed and any further processing of the Transport Packet carried in the current CS-PDU is performed at step 154. Control then passes back to step 150.

If, however, at step 162 the TCI bit indicates that timestamp adjustment is to be performed (i.e., TCI ='1'), then control passes to step 164. At this point, the TRC field of the CS-PDU header reflects the accumulated variable delay imposed upon the cell carrying the CS-PDU header as it propagated through the ATM network. At step 164, any additional variable delay, $\Delta T_D$, imposed by the destination node is measured. Variable delay at the destination node may be caused, for example, by additional queuing delays or by the CS-PDU reassembly function (steps 156–158). At step 166, the MPEG-2 Transport Packet carried in the CS-PDU payload is extracted, and the TRC and $\Delta T_D$ values are added to the PCR value carried in the adaptation field of the Transport Packet.

Recall from above, that the PCR value in a given Transport Packet comprises a 33-bit base component representing a 90 kHz clock value, and a 9-bit extension component representing a 27 MHz clock value. Prior to adding the TRC value to the PCR, the TRC must be translated into this format. Translation may be performed as follows:

TRC(base) = int[TRC/300]

TRC(extension) = TRC−TRC(base)

where,

TRC is the value in the CS-PDU header prior to translation;

TRC(base) is the 33-bit base component of the TRC after translation; and

TRC(extension) is the 9-bit extension component of the TRC after translation.

At step 166, the TRC(base) value is added to the 33-bit base component of the PCR, and the TRC(extension) value is added to the 9-bit extension component of the PCR. Any additional variable delay imposed at the destination node, $\Delta T_D$, is also added to the PCR. Similar translation of the $\Delta T_D$ value may also be required. The adjusted PCR value may therefore be expressed as:

PCR(adjusted) = PCR(original) +TRC(base, extension) +$\Delta T_D$

The adjusted PCR value therefore reflects any variable delays imposed by the ATM network. Assuming no other variable delays are imposed on the Transport Packet before it reaches a decoder, the adjusted PCR value should substantially agree with the value of the decoder system clock upon receipt. Control may then pass back to step 150.

Figure 7:
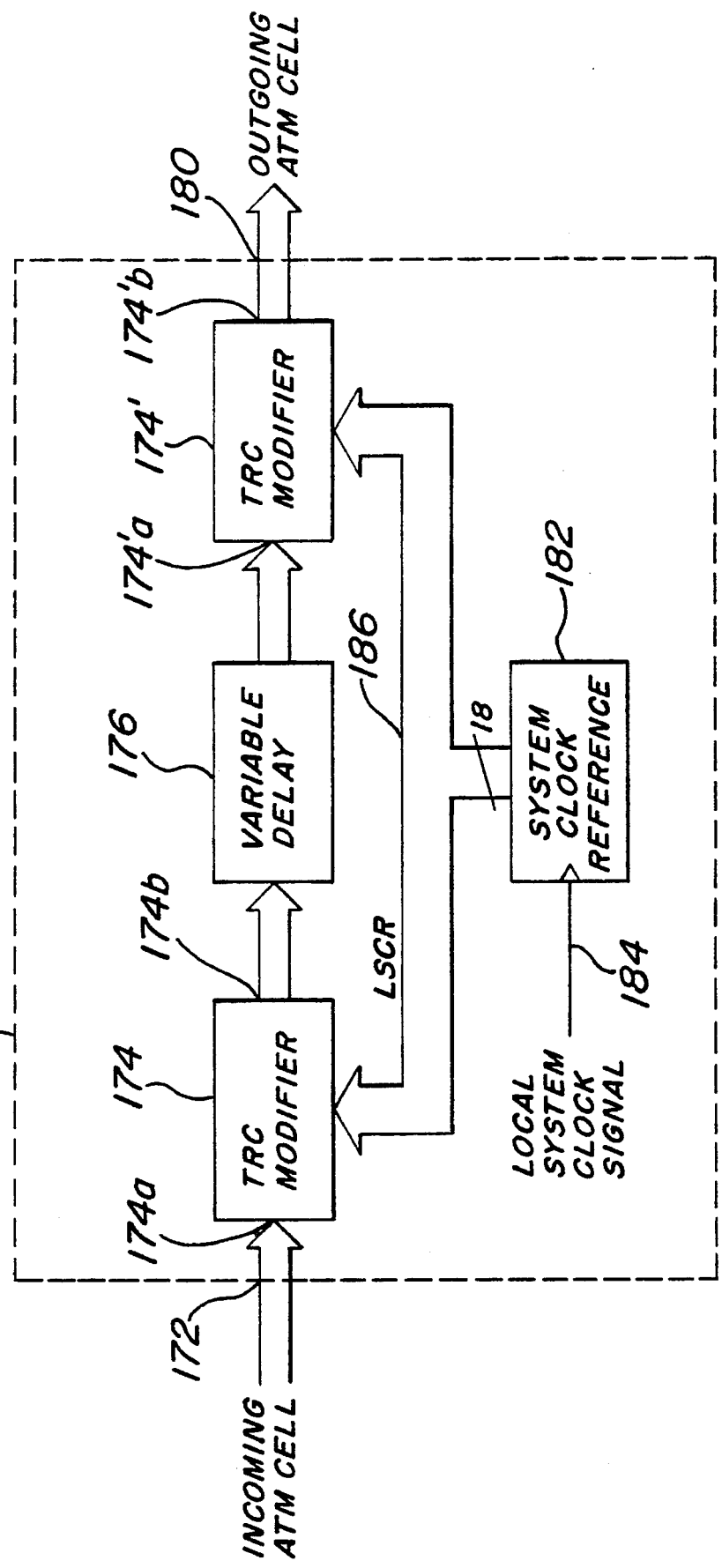
FIG. 7 is a block diagram of apparatus for maintaining, in a field of an ATM cell, an accumulation of the variable delay imposed on the ATM cell as it passes through a switching node, in accordance with a preferred embodiment of the present invention.

FIG. 7 is a block diagram of an exemplary ATM switching node 170 that incorporates apparatus for maintaining an accumulation of the variable delay imposed on an ATM cell as it passes through the switching node 170. According to the present invention, the apparatus comprises a first TRC modifier module 174 connected to the input 172 of the node 170, and a second TRC modifier module 174' coupled to the output 180 of the node. The apparatus further comprises a local system clock reference counter 182 that is driven by a local system clock signal provided on line 184. The counter 182 increments at each cycle of the system clock signal, which in the preferred embodiment, operates at a nominal frequency of 27 MHz. At any given time, the state of the counter 182 represents the absolute value of the local system clock. The value of the counter 182 is continuously provided on line 186 to the first and second TRC modifier modules 174 and 174'. In the present embodiment, the value of the system clock reference counter 182 comprises eighteen (18) bits, i.e., the same length as the TRC field of a CS-PDU header. The internal circuitry of the switching node 170, which is assumed to impose a variable delay on an ATM cell as it passes through the node 170, is represented by block 176.

An ATM cell enters the node 170 at input 172 and passes directly to the input 174a of the first TRC modifier module 174. As described hereinafter in greater detail, assuming that the cell carries a CS-PDU header and that jitter tracking should be performed (e.g., TCI =1), the TRC modifier circuit 174 subtracts the value of the local system clock reference counter 182 from the TRC field of the CS-PDU header carried in the received ATM cell. The result of the subtraction is then inserted in place of the previous value in the TRC field as the cell leaves the module 174. The ATM cell then passes through the internal circuitry (block 176) of the node 170 where the cell is assumed to experience a variable delay. As the cell is passing through the node 170, the local system clock reference counter 182 is incrementing at each cycle of the local system clock signal.

Before exiting the node 170, the cell passes through the second TRC modifier module 174'. As explained hereinafter in greater detail, the second TRC module 174' adds the updated value of the local system clock reference counter 182 to the TRC field of the CS-PDU header carried in the cell. Again, the result is copied over the value the TRC field had upon entering the second module 174'. As a result of this addition step, the new value in the TRC field will be equal to the value the TRC field had when the cell first entered the node 170 plus the value of any variable delay the cell experienced upon passing through the node 170.

As an example, assume an ATM cell carrying a CS-PDU header enters the node and that jitter tracking is to be performed (i.e., TCI =1). Upon entering the node 170, the TRC field of the CS-PDU header has an initial value, $TRC_{in}$. Upon exiting the first module 174, the TRC field will have a modified value, $TRC_{mod}$, equal to its initial value, $TRC_{in}$, minus the value of the local system clock reference, $LSCR(t_{in})$, at the time the cell entered the first module 174. Thus, $$TRC_{mod} = TRC_{in} - LSCR(t_{in})$$

While the ATM cell is passing through the node 170, the local system clock reference counter 182 is updating at a rate of 27 MHz. Before exiting the device 170, the cell will pass through the second module 174' which will add the updated value of the local system clock reference, $LSCR(t_{out})$, to the modified TRC value, $TRC_{mod}$, to produce an adjusted value, $TRC_{adj}$, that reflects the variable delay imposed on the ATM cell as it passed through the device 170. That is, $$\begin{aligned} TRC_{adj} &= TRC_{mod} + LSCR(t_{out}) \\ &= (TRC_{in} - LSCR(t_{in})) + LSCR(t_{out}) \\ &= TRC_{in} + (LSCR(t_{out}) - LSCR(t_{in})) \end{aligned}$$

where, $LSCR(t_{out})-LSCR(ti_{in})$ represents the variable delay, $\Delta T_D$, imposed by the switching node 170.

Figure 8:
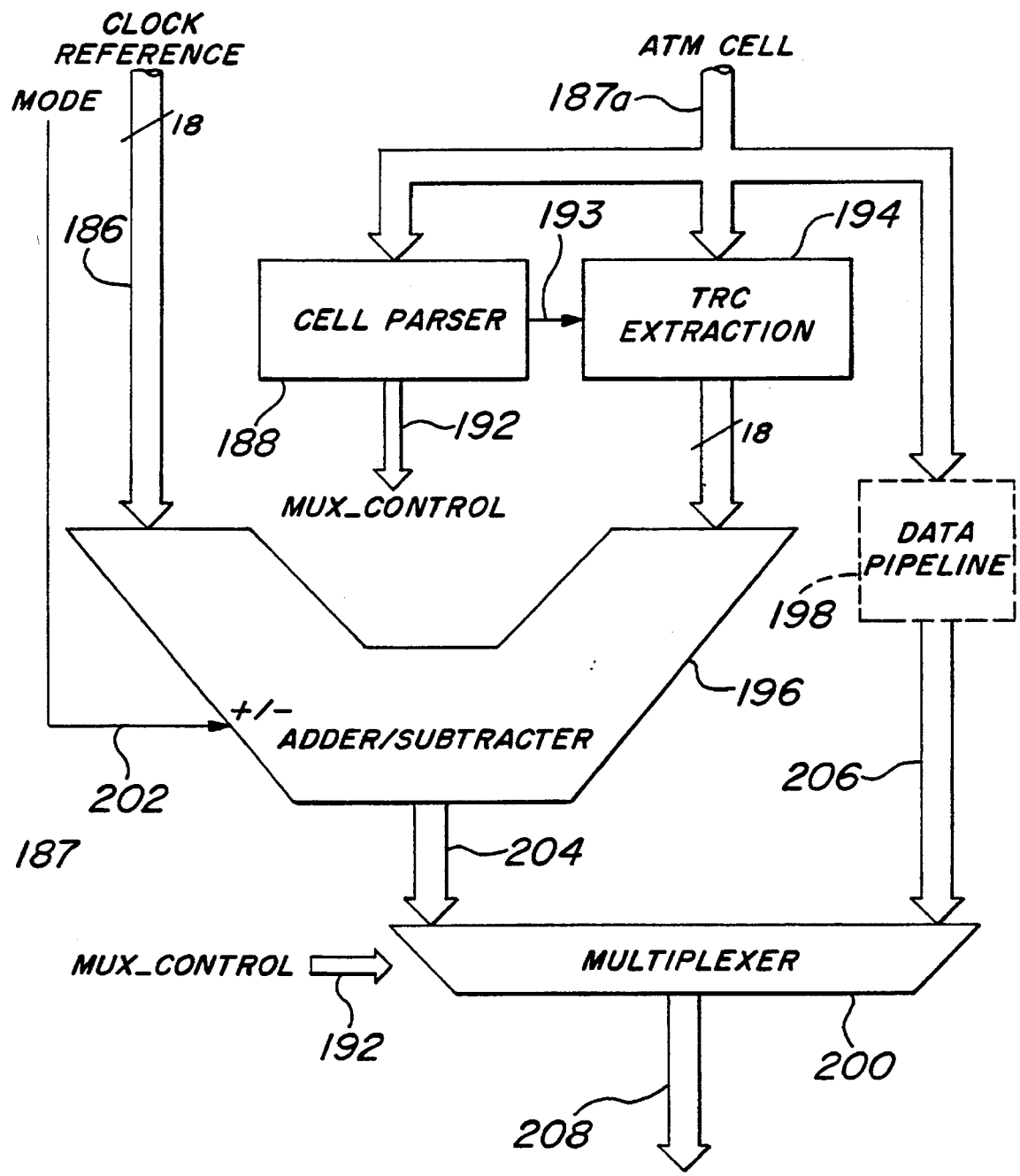
FIG. 8 is a block diagram illustrating further details of the apparatus of FIG. 7.

FIG. 8 is a block diagram illustrating details of a TRC modifier module 187 that may be used to implement both of the modules 174 and 174' of FIG. 7. As shown, the module has an input 187a for receiving an ATM cell. Input 187a forms inputs 174a and 174a' of the respective modules 174, 174' of FIG. 7. An ATM cell entering the module 187 via line 187a is provided to a cell parser 188, a TRC extraction module 194 and a data pipeline 198. The cell parser 188 parses the header of the incoming ATM cell to determine first whether the ATM cell caries a CS-PDU header (step 132 of FIG. 6). If so, the cell parser examines the TCI flag in the CS-PDU header (steps 134–136). If the TCI flag indicates that the packet of data in the CS-PDU payload contains a time stamp value and that jitter tracking is therefore required (i.e., TCI =1), the cell parser 188 provides an appropriate signal to the TRC extraction unit 194 which extracts the TRC field (i.e., 18 bits) of the CS-PDU header from the incoming cell. The extracted TRC value is provided to one input of an adder/subtractor unit 196. The local system clock reference, LSCR, is provided to the other input of the adder/subtractor unit 196. The adder/subtractor unit 196 can be set, via a "mode" input 202, to perform either addition or subtraction. When the module 187 is used to implement the first module 174 of FIG. 7, the mode is set for subtraction. When the module 187 is used to implement the second module 174' of FIG. 7, the mode is set for addition. The result of the addition or subtraction is provided via line 204 to one input of a multiplexer 200. The other input of the multiplexer 200 receives cell data from the data pipeline 198 via line 206. The multiplexer output is controlled by the multiplex control signal provided on line 192 from the cell parser 188.

The data pipeline 198 receives the ATM cell on line 187a and delays the propagation of the cell, if necessary, for a sufficient amount of time to allow the addition/subtraction to be performed by the adder/subtractor unit 196. Initially, line 206 is selected for output from the multiplexer 200, and therefore, the data of the ATM cell begins to pass through the multiplexer 200 to output line 208. As the TRC field of the CS-PDU header in the cell reaches the input of the multiplexer 200, the output of the multiplexer 200 is switched to line 204 so that the modified TRC value replaces the previous TRC value. Once the data of the modified TRC field has passed through the multiplexer 200, the output of the multiplexer 200 switches back to line 206 in order to output the remainder of the ATM cell on line 208. Thus, the multiplexer 200 serves as a drop-add multiplexer to replace the value of the TRC field in the received ATM cell with the result of the addition/subtraction operation. The module 187 operates as described above on each successive ATM cell received by the module.

As the foregoing illustrates, the present invention is directed to methods for adjusting the timestamps of a datastream transmitted through an ATM based network to account for jitter introduced by the network. Although the present invention is particularly applicable to the transmission of MPEG-2 Transport Streams across an ATM network, the present invention is by no means limited thereto. Rather, the methods of the present invention are useful in connection with the transmission of any type of datastream that carries timestamps at periodic intervals within the datastream. For example, the methods of the present invention may be employed to correct the SCR timestamps of an MPEG-2 Program Stream transmitted through an ATM network. As can be appreciated, all that is required to practice the present invention with other datastream formats, such as the MPEG-2 Program Stream format, is to define a new CS-PDU format having a payload size adapted to carry a packet of that transport stream. The CS-PDU header and the use of the information contained therein in accordance with the present invention would not change. Accordingly, it is understood that changes may be made to the embodiments described above without departing from the broad inventive concepts thereof, and therefore, reference should be made to the appended claims, rather than to the foregoing specification, as indicating the scope of the invention.

What is claimed is:

1. A method of transmitting a packet of data through an Asynchronous Transfer Mode (ATM) network wherein the packet of data contains a timestamp value, said method comprising the steps of:

(a) encapsulating the packet of data in a convergence sublayer protocol data unit (CS-PDU) having a header and a payload, the payload comprising the packet of data;

(b) segmenting the CS-PDU and inserting successive segments of the CS-PDU into a plurality of ATM cells, one of said ATM cells carrying the CS-PDU header;

(c) maintaining, in a field of the CS-PDU header carried in said one ATM cell, a value indicative of the accumulated variable delay imposed upon said one ATM cell as the plurality of ATM cells are transmitted through switching nodes of the network;

(d) receiving said plurality of ATM cells at a destination node of the network, and reassembling the CS-PDU therefrom; and (e) adjusting the timestamp value of the packet of data based on the accumulated delay value in said field of the CS-PDU header.

2. The method of claim 1 wherein step (c) comprises performing the following steps at each switching node through which said plurality of ATM cells are transmitted:

(i) receiving said plurality of ATM cells and identifying the ATM cell carrying the CS-PDU header;

(ii) determining the amount of variable delay imposed by the switching node on the ATM cell carrying the CS-PDU header; and (iii) adding a value indicative of the amount of variable delay to said field of the CS-PDU header.

3. The method of claim 2 wherein each of said plurality of ATM cells comprises a header and a payload, the payload portion of each ATM cell carrying a respective one of the segments of the CS-PDU, the header of each ATM cell comprising an indicator that indicates whether that ATM cell carries the CS-PDU header, and further wherein, at each switching node, said step of identifying the ATM cell carrying the CS-PDU header comprises examining the indicator in the header of each ATM cell received by the switching node.

4. The method of claim 2 wherein each switching node has an input, an output and a local system clock, and wherein the amount of variable delay imposed on the ATM cell carrying the CS-PDU header by a switching node is determined as follows:

$$\Delta T_N = LSCR(t_{out}) - LSCR(t_{in}) - D$$

where, $\Delta T_N$ is the amount of variable delay imposed on the ATM cell;

$LSCR(t_{out})$ is the value of the local system clock of the switching node when the ATM cell reaches the output of the switching node;

$LSCR(t_{in})$ is the value of the local system clock of the switching node when the ATM cell reaches the input of the switching node; and D is a measure of the constant delay imposed by the switching node on all ATM cells.

5. The method of claim 1 wherein said step of adjusting the timestamp value of the packet of data comprises adding the accumulated delay value to the timestamp value.

6. A method of transmitting packets of data through an Asynchronous Transfer Mode (ATM) network wherein selected ones of the packets of data contain timestamp values, said method comprising the steps of:

(a) encapsulating each packet of data in a respective convergence sublayer protocol data unit (CS-PDU) having a header and a payload, the payload comprising the respective packet of data, the header comprising a time reference correction (TRC) field;

(b) segmenting each CS-PDU and inserting successive segments of each CS-PDU into a respective plurality of ATM cells, one of the respective plurality of ATM cells containing the header of the CS-PDU, each ATM cell having a header comprising an indicator that indicates whether the ATM cell carries the header of a CS-PDU;

(c) transmitting each ATM cell into the network and performing the following additional steps at each of a plurality of switching nodes in the network:
   (i) receiving an ATM cell at the switching node and determining, based on the indicator in the header of the received ATM cell, whether the received ATM cell carries the header of a CS-PDU;
   (ii) if the received ATM cell carries the header of a CS-PDU, then determining the amount of variable delay imposed by the switching node on the received ATM cell; and
   (iii) adding a value indicative of the amount of variable delay to the TRC field of the CS-PDU header carried in the ATM cell prior to transmitting the ATM cell to a next switching node;

(d) receiving a plurality of ATM cells containing the respective segments of one of said CS-PDUs and reassembling the CS-PDU therefrom; and (e) if the packet of data carried in the payload of the CD-PDU contains a timestamp value, adjusting the timestamp value based on the accumulated delay value in the TRC field of the CS-PDU header.

7. The method of claim 6 wherein the header of each CD-PDU further comprises a time correction indicator (TCI) that indicates whether the packet of data carried in the payload of the CS-PDU contains a timestamp value, and wherein step (c) further comprises examining the TCI of the CD-PDU header and only performing steps (c) (ii) and (c) (iii) if the TCI indicates that the packet of data carried in the payload of that CS-PDU contains a timestamp value.

8. The method of claim 6 wherein each switching node has an input, an output and a local system clock, and wherein the amount of variable delay imposed by a switching node on an ATM cell carrying the header of a CS-PDU is determined as follows:

$$\Delta T_N = LSCR(t_{out}) - LSCR(t_{in}) - D$$

where, $\Delta T_N$ is the amount of variable delay imposed on the ATM cell;

$LSCR(t_{out})$ is the value of the local system clock of the switching node when the ATM cell reaches the output of the switching node;

$LSCR(t_{in})$ is the value of the local system clock of the switching node when the ATM cell reaches the input of the switching node; and D is a measure of the constant delay imposed by the switching node on all ATM cells.

9. The method of claim 6 wherein said step of adjusting the timestamp value in the packet of data comprises adding the accumulated delay value to the timestamp value.

10. A method of transmitting packets of data through an Asynchronous Transfer Mode (ATM) network wherein selected ones of the packets of data contain timestamp values, said method comprising the steps of:

(a) encapsulating each packet of data in a respective convergence sublayer protocol data unit (CS-PDU) having a header and a payload, the payload comprising the respective packet of data, the header comprising a time reference correction (TRC) field and a time correction indicator (TCI) that indicates whether the packet of data in the payload of the CS-PDU contains a timestamp value;

(b) segmenting each CS-PDU and inserting successive segments of each CS-PDU into a respective plurality of ATM cells, one of the respective plurality of ATM cells containing the header of the CS-PDU, each ATM cell having a header comprising an indicator that indicates whether the ATM cell carries the header of a CS-PDU;

(c) transmitting each ATM cell into the network and performing the following additional steps at each of a plurality of switching nodes in the network:
   (i) receiving an ATM cell at the switching node and determining, based on the indicator in the header of the received ATM cell, whether the received ATM cell carries the header of a CS-PDU;
   (ii) if the received ATM cell carries the header of a CS-PDU, then examining the TCI in the CS-PDU header and determining therefrom whether packet of data carried in the payload of that CS-PDU contains a timestamp value;
   (iii) if the TCI indicates that the packet of data contains a timestamp value, then determining the amount of variable delay imposed by the switching node on the received ATM cell; and
   (iv) adding a value indicative of the amount of variable delay to the TRC field of the CS-PDU header carried in the received ATM cell prior to transmitting that ATM cell to a next switching node.

11. The method of claim 10 wherein each switching node has an input, an output and a local system clock, and wherein the amount of variable delay imposed by a switching node on an ATM cell carrying the header of a CS-PDU is determined as follows:

$$\Delta T_N = LSCR(t_{out}) - LSCR(t_{in}) - D$$

where, $\Delta T_N$ is the amount of variable delay imposed on the ATM cell;

$LSCR(t_{out})$ is the value of the local system clock of the switching node when the ATM cell reaches the output of the switching node;

$LSCR(t_{in})$ is the value of the local system clock of the switching node when the ATM cell reaches the input of the switching node; and D is a measure of the constant delay imposed by the switching node on all ATM cells.

12. The method of claim 10 further comprising performing the following steps at a destination node of the network:

(i) receiving a plurality of ATM cells containing the respective segments of a CS-PDU and reassembling the CS-PDU therefrom;

(ii) extracting the respective packet of data from the payload of the reassembled CS-PDU;

(iii) examining the TCI of the header of the CS-PDU to determine whether the extracted packet of data contains a timestamp value; and (iv) if the TCI indicates that the packet of data contains a timestamp value, adjusting the timestamp value based on the accumulated delay value in the TRC field of the CS-PDU header.

13. The method of claim 12 wherein said step of adjusting the timestamp value in the packet of data comprises adding the accumulated delay value to the timestamp value.

* * * * *